United States Patent
Boldi et al.

(10) Patent No.: US 9,960,821 B2
(45) Date of Patent: May 1, 2018

(54) METHOD FOR ADAPTIVE DISTRIBUTED MOBILE COMMUNICATIONS, CORRESPONDING SYSTEM AND COMPUTER PROGRAM PRODUCT

(75) Inventors: Mauro Boldi, Turin (IT); Paolo Gianola, Turin (IT); Bruno Melis, Turin (IT); Alfredo Ruscitto, Turin (IT)

(73) Assignee: TELECOM ITALIA S.P.A., Milan (IT)

( * ) Notice: Subject to any disclaimer, the term of this patent is extended or adjusted under 35 U.S.C. 154(b) by 452 days.

(21) Appl. No.: 13/142,568

(22) PCT Filed: Dec. 30, 2008

(86) PCT No.: PCT/EP2008/011139
§ 371 (c)(1),
(2), (4) Date: Jun. 28, 2011

(87) PCT Pub. No.: WO2010/075865
PCT Pub. Date: Jul. 8, 2010

(65) Prior Publication Data
US 2011/0275376 A1    Nov. 10, 2011

(51) Int. Cl.
*H04B 7/02* (2017.01)
*H04B 7/022* (2017.01)
*H04B 7/026* (2017.01)
*H04B 7/06* (2006.01)

(52) U.S. Cl.
CPC .............. *H04B 7/022* (2013.01); *H04B 7/026* (2013.01); *H04B 7/0617* (2013.01)

(58) Field of Classification Search
CPC ..................................................... H04B 7/022
See application file for complete search history.

(56) References Cited

U.S. PATENT DOCUMENTS

| | | | |
|---|---|---|---|
| 7,747,285 B2 | 6/2010 | Lozano | |
| 7,760,699 B1 | 7/2010 | Malik | |
| 7,809,073 B2 | 10/2010 | Liu | |
| 8,041,395 B2 | 10/2011 | Lo et al. | |
| 2002/0193146 A1* | 12/2002 | Wallace et al. | 455/562 |
| 2005/0141545 A1 | 6/2005 | Fein et al. | |

(Continued)

FOREIGN PATENT DOCUMENTS

| | | |
|---|---|---|
| EP | 1 530 316 A1 | 5/2005 |
| EP | 1 777 837 A1 | 4/2007 |

(Continued)

OTHER PUBLICATIONS

International Search Report from the European Patent Office for International Application No. PCT/EP2008/011139, dated Sep. 22, 2009.

*Primary Examiner* — Jason E Mattis
(74) *Attorney, Agent, or Firm* — Finnegan, Henderson, Farabow, Garrett & Dunner, L.L.P.

(57) ABSTRACT

A method of arranging exchange of signals between user terminals in a cellular communication system and at least one base station including a central unit and a plurality of remote units. The method includes exchanging signals with at least one user terminal simultaneously via at least two remote units by applying at the at least two remote units, separate distributing weighting functions to the signals exchanged with the at least one user terminal.

14 Claims, 8 Drawing Sheets

(56) References Cited

U.S. PATENT DOCUMENTS

| | | |
|---|---|---|
| 2006/0217158 A1 | 9/2006 | Uwano et al. |
| 2007/0072646 A1 | 3/2007 | Kuwahara et al. |
| 2007/0093273 A1 | 4/2007 | Cai |
| 2008/0003948 A1 | 1/2008 | Mitran |
| 2008/0070502 A1* | 3/2008 | George et al. ............... 455/41.2 |
| 2008/0117961 A1* | 5/2008 | Han ...................... H04B 7/043 |
| | | 375/227 |
| 2008/0150514 A1* | 6/2008 | Codreanu et al. ......... 324/76.77 |
| 2009/0238566 A1* | 9/2009 | Boldi et al. ..................... 398/59 |
| 2010/0080555 A1* | 4/2010 | Xu et al. ......................... 398/43 |
| 2010/0279729 A1* | 11/2010 | Hui ...................... H04B 7/024 |
| | | 455/522 |
| 2011/0086654 A1* | 4/2011 | Larsson ....................... 455/501 |
| 2011/0255434 A1 | 10/2011 | Ylitalo |

FOREIGN PATENT DOCUMENTS

| | | |
|---|---|---|
| WO | WO 2004/047472 A1 | 6/2004 |
| WO | WO 2006/102919 A1 | 10/2006 |
| WO | WO 2007-059496 A2 | 5/2007 |
| WO | WO 2008/003022 A2 | 1/2008 |

* cited by examiner

METHOD FOR ADAPTIVE DISTRIBUTED MOBILE COMMUNICATIONS, CORRESPONDING SYSTEM AND COMPUTER PROGRAM PRODUCT

CROSS REFERENCE TO RELATED APPLICATION

This application is a national phase application based on PCT/EP2008/011139, filed Dec. 30, 2008, the content of which is incorporated herein by reference.

FIELD OF THE INVENTION

This disclosure relates to techniques for providing radio access in mobile communication.

More specifically, this disclosure has been developed with attention paid to its possible use in networks employing distributed antenna systems (DAS).

DESCRIPTION OF THE RELATED ART

The radio coverage provided by mobile radio systems is obtained by installing a plurality of radio base stations (BS). Mobile user equipments (UE) may communicate with the communication network through one of the radio base stations of the system, e.g. the one station from which it receives the radio signal with best signal quality. Some mobile communication systems, such as Universal Mobile Telecommunications System (UMTS), envisage also the possibility that a user terminal may be served simultaneously by a plurality of radio base stations, called also "macro-diversity". Thus, appropriate handover (or handoff) procedures have to be provided in order to guarantee the continuity of the communication also in case of a passage from one cell to another, especially for users moving at high speed.

The above-mentioned concept of "macro-diversity" is being studied in research activities in this framework and is evolving towards a more general scenario to fully exploit cooperation among multiple transmitting/receiving nodes. Such kind of interaction among transmitters/receivers in radio access systems, currently analyzed in standardization bodies, is called Coordinated MultiPoint (COMP) transmission.

In this context, Distributed Antenna Systems (DAS) having a coordinate physical layer may permit to reduce cell handovers with the possibility to improve also the overall efficiency of the network.

Such Distributed Antenna Systems become even more interesting considering the fact that fixed and mobile operators are moving towards the deployment of optical fiber network as transport access network.

In this way it is possible to guarantee high bit rate on the radio interface and to create synergies with the deployment of next generation networks generally conceived for fixed access. It is therefore important that future networks make efficient use of the capacities available.

For example, in a DAS based on digital radio over fiber (RoF) as data transport system, it is possible to find a synergy point between fixed and wireless access networks.

FIG. 1 shows a conventional DAS architecture including one central unit CU connected preferably by means of a fiber link 16 to a plurality of remote units RU (for simplicity, FIG. 1 shows a single remote unit RU; however a plurality of remote units may be connected to a single fiber link).

The or each central unit CU is connected to the network of the telecommunication operator via an interface IF. The central unit CU performs the main signal processing operations of a conventional base station equipment. It includes a block 10 to implement the higher layer protocols (L2/L3), such as Radio Resource Control (RRC), Radio Link Control (RLC) and Medium Access Control (MAC), and a block 12 to perform the physical layer (L1) signal processing operations up to the generation of a composite digital baseband signal.

The composite digital baseband signal is then converted from electrical to optical (E/O) by means of a block 14 and transmitted over a fiber link 16 to the remote units RU.

Each remote unit RU receives the composite baseband signal that is first converted from optical to electrical (O/E) by means of a block 18. The signal is then filtered by a front-end block 20, converted from digital to analog (D/A) at a block 22, up-converted from baseband to radiofrequency (RF) and amplified by a power amplifier at a block 24, and radiated by antennas TX.

FIG. 1 shows a remote unit RU equipped with $K_m$ antennas TX (where $K_m \geq 1$). Such a remote unit RU permits also to implement a Reconfigurable Antenna system where the radiation diagram of the RU antenna array is remotely controlled on cell basis by means of Operation and Maintenance (O&M) commands. For example, the radiation diagram of the antenna array of the remote units RU may be modified by means of a block 26, which implements a cell weighting operation where a set of $K_m$ complex beamforming weights is applied at digital level on the composite baseband signal, associated to each cell, to be radiated from the antennas TX. The beamforming weights are computed by a Network Manager System and provided to the remote units RU in the form of semi-static configuration parameters. These beamforming weights can be adapted on a long term basis according to traffic variations or to changes in the network configuration. An example of such a re-configurable DAS architecture is described in the document WO-A-2006/102919.

The previous signal processing steps refer to downlink transmission. In uplink transmission the inverse operations may be performed both in the remote units RU and the central unit CU.

Specifically, FIG. 2 shows a DAS receive architecture comprising a central unit CU and remote units RU (again, a single remote unit RU is shown in FIG. 2; however a plurality of remote units may be connected to a single fiber link).

In the exemplary DAS architecture illustrated, each remote unit RU receives data at $K_m$ antennas RX. The received data are then down-converted from radiofrequency to baseband at blocks 44, and converted from analog to digital (A/D) at blocks 42 before the signals may be filtered by front-ends 40.

Again, the radiation diagram of the remote unit antenna array may be modified by means of a block 46 which implements a cell weighting operation.

The weighted composite digital baseband signals are then converted from electrical to optical by means of a block 38, before the signals are transmitted over a fiber link 36 to the central unit CU.

The weighted composite baseband signals are converted back from optical to electrical at a block 34, before the signals are processed by a block 32, which performs the physical layer (L1) signal processing operations, and a block 30, which implements the higher layer protocols (L2/L3). The received data are then made available to the network via an interface IF.

In case of a radio access technology based on Code Division Multiple Access (CDMA), the composite signal transmitted over the fiber links 16 and 36 is a chip level signal formed by the aggregation of the various user signals. The different user signals are separated in the code domain by allocating to each user a different spreading sequence. Examples of radio access technologies using CDMA are the Universal Mobile Telecommunications System (UMTS) and the correspondent evolution denoted as High Speed Packet Access (HSPA).

In case of a radio access technology based on Orthogonal Frequency Division Multiple Access (OFDMA), the time domain signal is sent over the fiber links 16 and 36 after the Inverse Fast Fourier Transform (IFFT) operation at the transmitter. Also in this case, the various user signals are superimposed in the time domain. Examples of radio access technologies that use the OFDMA technique are the Worldwide Interoperability for Microwave Access (WiMAX) system and the evolution of the UMTS system denoted as Evolved UTRAN (E-UTRAN) or Long Term Evolution (LTE).

However, such DAS have several limitations when being applied to modern radio techniques. In fact, such radio techniques may provide effective throughput and coverage increase, but they may need more and more capacity on the transport network.

It is therefore of fundamental importance for the future mobile networks to have a transport network, which can support the increasing radio capacity.

A solution known in the art provides for associating with single radio base station a plurality of antenna points/elements, e.g. via a Radio Over Fiber (ROF) communication system. A number of documents address the problem of flexibility and re-configurability of the radio base stations. For instance, WO-A-2004/047472 describes a main-remote radio base station system including plural remote radio units (RRUs). Fiber costs are significantly reduced using a single optical fiber that communicates information between the main unit and the remote units connected in a series configuration. Information from the main unit is sent over a first fiber path to the remote units so that the same information is transmitted over the radio interface by the remote units at substantially the same time. The unit receives the same information from each of the remote units over a second fiber path at substantially the same time. Delay associated with each remote unit is compensated for by advancing the time when information is sent to each remote unit. A data distribution approach over a single fiber avoids the expense of separate fiber couplings between the main unit and each remote radio unit or RRU. That approach also avoids the expense of WDM technology including "colored" lasers and OADMs (Optical Add-Drop Multiplexers) as well as the logistical overhead needed to keep track of different wavelength dependent devices.

Also those arrangements that aim only at re-configurability of the antenna may play a role in this context. For instance, U.S. Pat. No. 6,621,469 discloses a distributed antenna device including a plurality of transmit antenna elements, a plurality of receive antenna elements and a plurality of amplifiers. One of the amplifiers is a power amplifier operatively coupled with each of the transmit antenna elements and mounted closely adjacent to the associated transmit antenna element, such that no appreciable power loss occurs between the power amplifier and the associated antenna element. At least one of the amplifiers is a low noise amplifier and is built into the distributed antenna device for receiving and amplifying signals from at least one of the receive antenna elements. Each power amplifier is a relatively low power, relatively low cost per watt linear amplifier chip.

Fundamentals of dynamic remotization of resources are reported in the document WO-A-2006/102919, where some Radio-over-Fiber based architectures are introduced, comprising also the possibility of varying allocated signals and antenna radiation diagrams in the set of controlled remote transmitters.

OBJECT AND SUMMARY OF THE INVENTION

As mentioned in the foregoing current distributed antenna systems have several limitations when being applied to modern radio techniques. The need is therefore felt for an arrangement wherein the cooperation among multiple transmitting/receiving nodes is exploited in a more satisfactory way than in the prior art considered in the foregoing.

More specifically, the need is felt for improved arrangements wherein:
  certain basic limitations regarding flexibility in the remote
    stations may be dispensed with, thus improving the
    degree of re-configurability of the network, including
    also antenna re-configurability,
  the interaction among transmitters/receivers in radio
    access systems is improved;
  the overall degree of flexibility of the system should be
    increased, without being limited to employing a greater
    or smaller number of radio resources on the optical
    network, and
  improved flexibility should be achieved in terms of use
    and of number of beacon channels that can be handled
    (as a whole, in terms of signal processing) as compared
    to conventional arrangements.

The object of the invention is thus to provide a satisfactory response to that need.

According to the present invention, that object is achieved by means of a method having the features set forth in the claims that follow. The invention also relates to a corresponding system, as well as a computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is intended to highlight the possibility for the present invention to be implemented in a distributed/modular fashion.

The claims are an integral part of the disclosure of the invention provided herein.

An embodiment of the arrangement described herein comprises an architecture based upon a system of distributed antennas connected to one or more central stations and which enables a dynamic management of the radio resources.

In an embodiment RoF digital technology in ring configuration is used, wherein distributed antennas (i.e. remote units) are connected to one or more central unit by means of optical rings. In an embodiment, the radio base stations may be configured by means of a digital interface.

In an embodiment, each user terminal may be connected to a plurality of remote units, whereby each remote unit may adapt the radiation pattern for each user independently. The coordinated transmission from multiple remote antenna units may be accomplished at different levels of the protocol stack. At physical layer level the signals transmitted by the different remote units can be pre-coded in order to maximize specific performance metrics at the user terminal, such for example the received signal to interference plus noise ratio (SINR). One simple form of precoding is realized by multiplying the signals transmitted by the different remote antenna units with respective complex weights. Such precoding is used in different wireless communication systems, such as UMTS, High Speed Packet Access (HSPA) or Long Term Evolution (LTE) system. For example, the weights may be determined in order to permit the coherent recombination of the signals at the antenna of the user terminal. Such operations may be executed separately for each user signal if the channels appreciated by the various users are different.

Several embodiments disclosed herein provide a more efficient management of the adaptive antenna system by moving part of the signal processing operations performed by the central units, as shown in FIGS. 1 and 2, to the remote units.

In an embodiment, the precoding weights are determined in the central unit. The weights and the user signals are then transmitted over the fiber to the remote antenna units involved in the procedure. The precoding weights may then be applied in the remote units by multiplying the users' signals with the corresponding weights. In an embodiment, the pre-coding weights are determined locally in the remote units. The pre-coding weights may then be applied in the remote units by multiplying the users' signals with the corresponding weights.

In an embodiment, plural remote units in the DAS may transmit to the same user terminal. In this way, the user equipment may receive multiple signals from the remote units along the DAS in a controlled manner. Such arrangement provides advantages for all the users, with a particular benefit for those located at cell borders.

In an embodiment, the plural radiating elements are used as elements of a MIMO architecture. The adaptive antenna systems may also be used to mitigate inter-cell interference by means of signal processing algorithms, and hence spectral efficiency may be improved. More complex coordination algorithms operating at physical layer level may also be implemented, including e.g. Zero Forcing (ZF) precoding, Minimum Mean Square Error (MMSE) precoding or Dirty Paper Coding (DPC).

The main advantages of the arrangement described herein in direct comparison to conventional prior art arrangements is the possibility of dynamically handling a plurality of users through a plurality of antennas in a physical layer coordinated approach.

In one or more embodiments, possible assignment criteria or assignment methods may depend e.g. upon:
- coverage data obtained in the planning procedure;
- actual voice and data traffic measured by the network;
- information related to traffic localization obtained by applying dedicated algorithms; and/or
- point measurements of coverage and interference.

BRIEF DESCRIPTION OF THE ANNEXED VIEWS

The invention will now be described, by way of example only, with reference to the enclosed views, wherein:

FIGS. 1 and 2 have already been described in the foregoing;

DETAILED DESCRIPTION OF EMBODIMENTS

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

The following is a detailed description of possible embodiments of a cellular communication system wherein signals are "exchanged" (i.e. transmitted and/or received) between user terminals and at least one base station including a central unit and a plurality of remote units. As indicated, such a base station arrangement is currently referred to as a Distributed Antenna System or DAS.

More specifically, in the following exemplary architectures of DAS systems are described that enable the management of resources in a very flexible manner.

The architectures disclosed are applicable to various radio networks, such as networks being based on OFDMA and CDMA access techniques.

The embodiments described herein are based on a modified DAS architecture.

Figure 1:
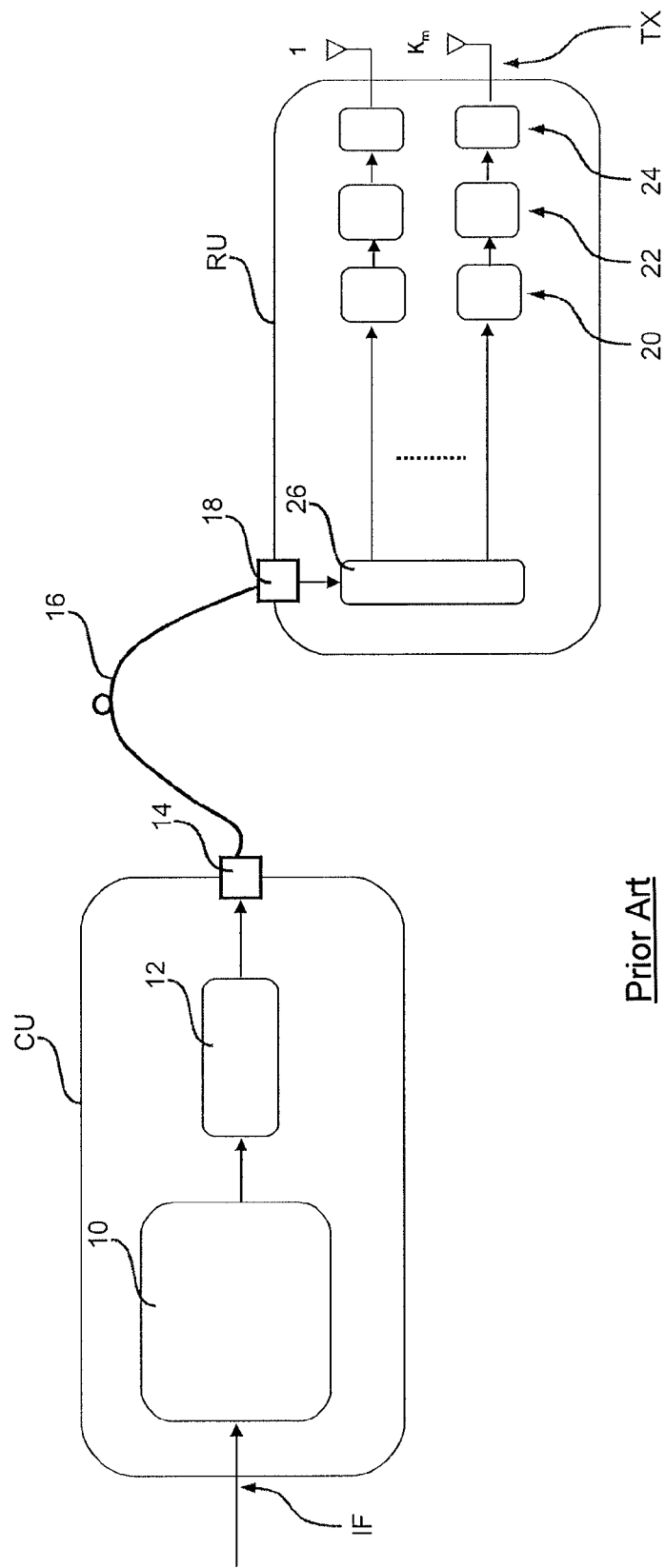
Figure 2:
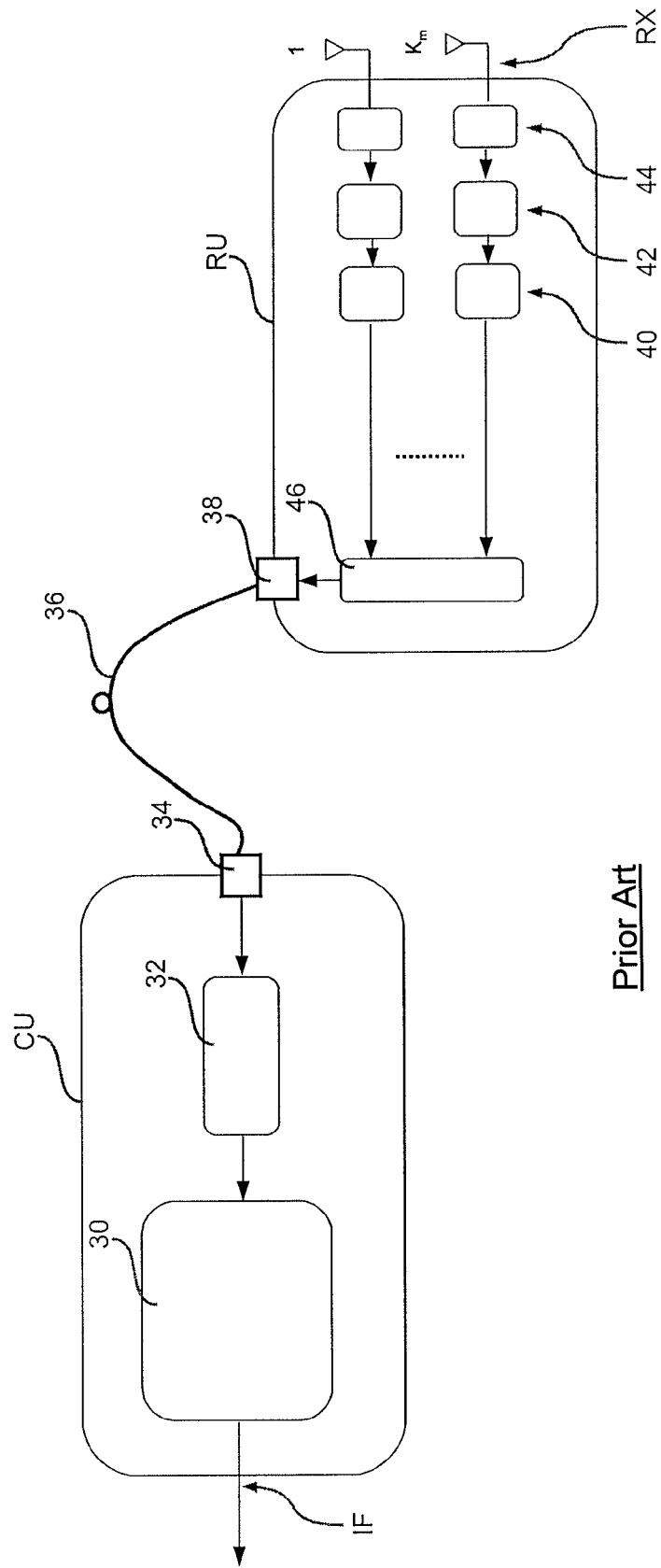
Figure 3:
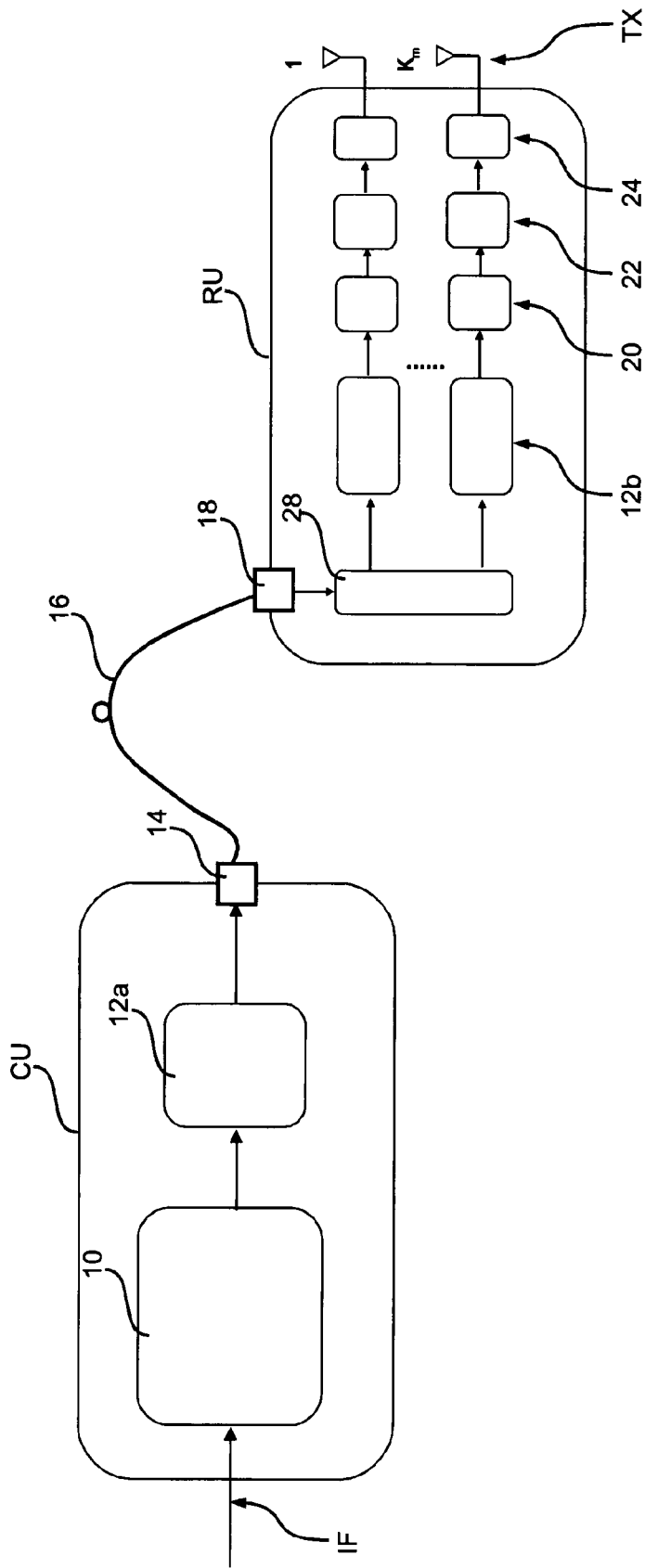
FIGS. 3 to 5 are block diagrams of a modified DAS architecture.

FIG. 3 shows a possible embodiment of the downlink portion of such a modified DAS architecture, wherein the baseband functionalities are split between a central unit CU and remote units RU (once more, while a single remote unit RU is shown in FIG. 3, a plurality of remote units may be connected to a single fiber link, e.g. an optical fiber ring).

In this embodiment, the central unit CU implements the higher layer protocol at a block 10 and physical layer signal processing at a block 12a. However, only the operations up to the generation of the coded user signals are performed in block 12a, including operations such as channel coding, Hybrid Automatic Repeat reQuest (H-ARQ), interleaving, modulation and MIMO processing.

In the exemplary embodiment illustrated, the user signals are then transmitted over the fiber link 16 to the remote units RU. For example, in case of OFDM systems, the downlink user signals in the frequency domain before the IFFT operation may be transmitted to the remote units RU, while the coded channels at symbol level, i.e. before the spreading operation, may be transmitted for a CDMA system. In the uplink case and for OFDM systems the user signals in the frequency domain after the FFT operation may be transmitted from the remote units RU to the central unit CU, while the coded channels at symbol level, i.e. after the de-spreading operation, may be transmitted for a CDMA system.

In the way, it is possible to perform user based signal processing operations, by applying a weighting function to user signal, separately in the remote units RU and for each user separately, because the user signals are still separated when they are exchanged with (i.e. transmitted to and/or received at) the remote units RU.

It is thus possible to perform a weighting operation, e.g. by applying a separate weighting function, on a per-user basis, in each remote unit RU. Such weighing operation may consists e.g. in the multiplication of the user data with a suitable set of complex weight at a block 28, before the signals are processed by a block 12b which implements the remaining operations of a conventional baseband modem. For example, this may include an Inverse Fast Fourier Transform (IFFT) and a Cyclic Prefix (CP) insertion for an OFDM system, or a spreading operation for a CDMA system.

The resulting signals may then be filtered by a front-end 20, converted from digital to analog (D/A) by a block 22, up-converted from baseband to radiofrequency (RF) and amplified by a power amplifier at a block 24, and radiated by the $K_m$ antennas TX to the user terminals.

Figure 4:
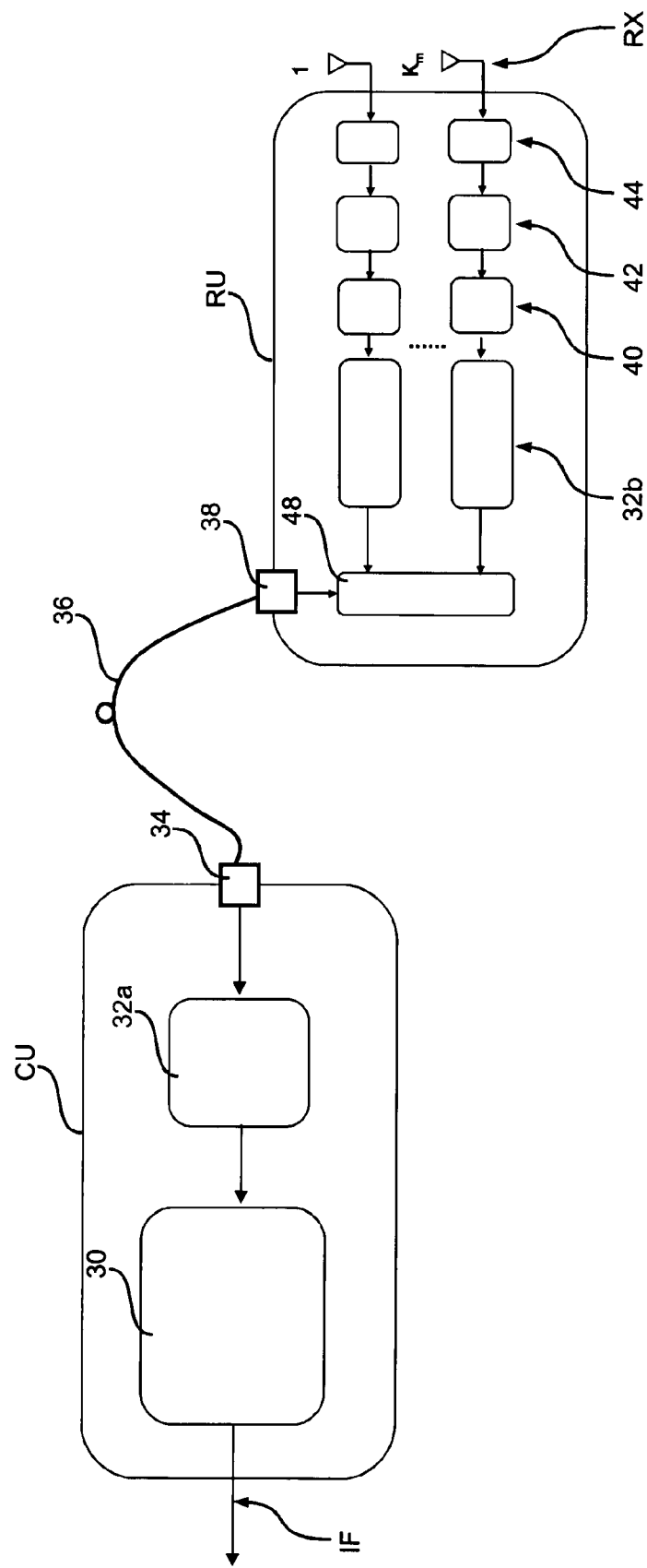

FIG. 4 shows an embodiment of a respective uplink portion of the modified DAS system comprising a central unit CU and remote units RU (as in previous cases, a single remote unit RU is shown in FIG. 4; however a plurality of remote units may be connected to a single fiber link, e.g. an optical fiber ring). Basically the DAS architecture for the receiver part is complementary to the transmitter architecture.

In the embodiment illustrated, the remote units RU receive data at $K_m$ antennas RX from the user terminals. The received data are then down-converted from radiofrequency to baseband at blocks 44, and converted from analog to digital (A/D) at blocks 42 before the signals are filtered by front-ends 40.

In this embodiment, also the remote units RU may process the received signals for the distinct user.

In the embodiment illustrated, user weights are applied in each remote unit RU to the received data at a block 48, e.g. by applying a weighting function to user signals. For this purpose, the $K_m$ received signals at baseband level are first subject to a processing in order to recover the user signals at a block 32b. This may include a CP removal operation and a Fast Fourier Transform (FFT) operation in case of OFDM systems, or a despreading operation for CDMA systems.

The weighted baseband signals are then combined and converted from electrical to optical at a block 38, before the signals are transmitted over a fiber link 36 to the central unit CU.

In this embodiment, the remaining operations of a conventional baseband modem are then performed in the central unit CU. Specifically, the weighted baseband signals are first converted back from optical to electrical at a block 34, before the signals are processed by a block 32a, which may implement operations such as MIMO processing, demodulation, deinterleaving, H-ARQ processing and decoding. The decoded data may then be passed to the block 30, which implements the higher layer protocols (L2/L3).

Figure 5:
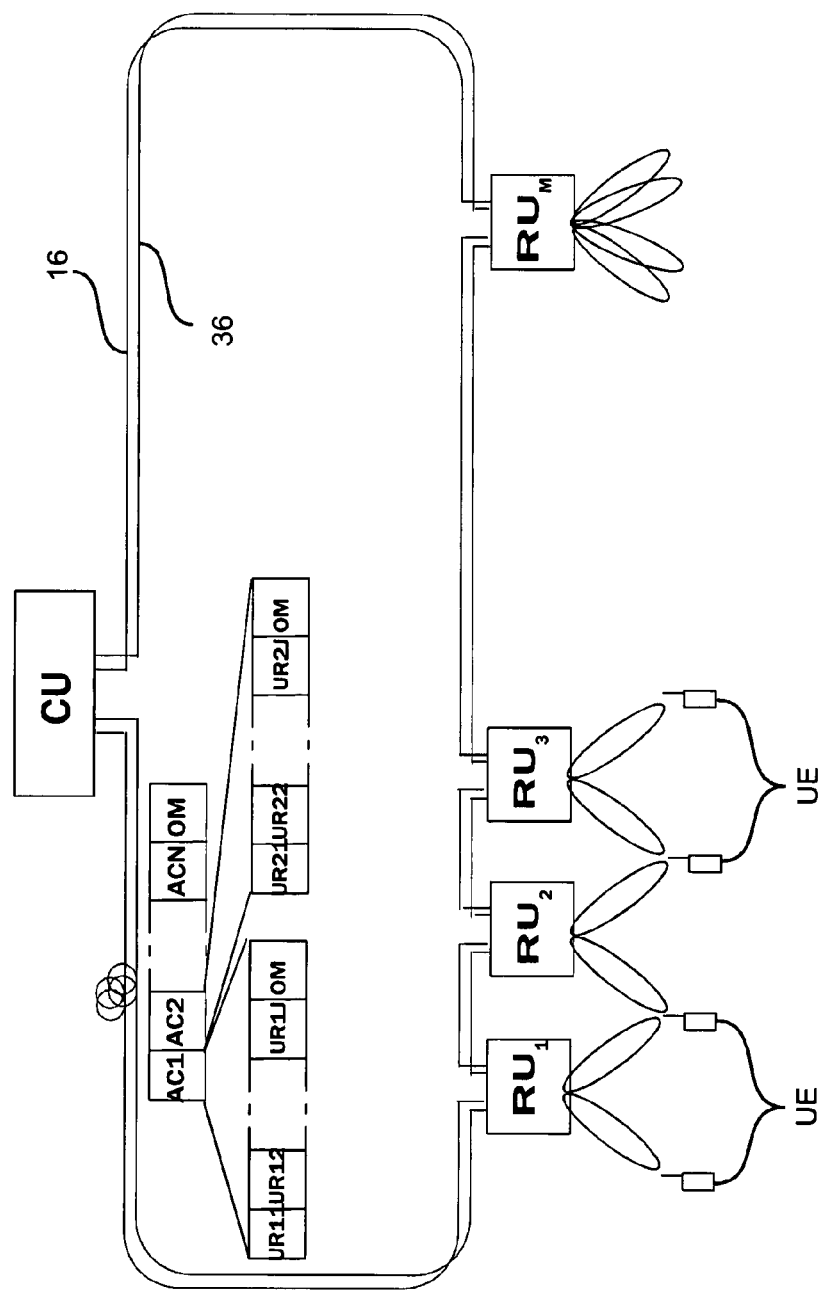

FIG. 5 provides an exemplary schematic representation of a complete DAS system comprising at least one central unit CU and M remote units RU, which exchange data with a plurality of user equipments UE in a cellular communication network.

The central units CU implements the main part of the radio base station and are connected to remote units RU and to the communication network.

A digital interface may be used for both connections. For example, the M remote units RU may be connected digitally to the central unit CU via a fiber ring. Specifically, the fiber ring may be used to transport the data of both the fiber links 16 and 36 in downlink and uplink, respectively. For example, a single optical fiber with bi-directional communication or two independent fibers may be used for this purpose.

In an embodiment, each remote unit may comprise a plurality of antenna elements (AE) used e.g. as transmission antennas TX and receive antennas RX, whereby each antenna element may be controlled by means of an input/output amplitude and phase signal. For example, the m-th remote unit RU may include $K_m$ antenna elements AE.

In an embodiment, the antenna elements AE are sub-arrays composed by a number of radiators, each fed with signals with a fixed ratio of amplitude and phase.

In the embodiment illustrated, data necessary for either transmission or reception in the radio communication system is exchanged in the form of N antenna carriers AC.

For example, in case of OFDM systems, the antenna carriers AC may be exchanged as signals in the frequency and/or time domain. In case of CDMA systems, the antenna carriers AC may be exchanged as symbol level signals before the spreading operation in downlink or after the de-spreading operation in uplink.

In an embodiment, the n-th antenna carrier AC comprises J user resources UR, wherein each user resource UR may be related to an elementary resource of the radio communication system. For example, codes in CDMA systems or physical resource blocks in OFDM systems.

The signal transmitted to or received from one user UE is then an aggregation of user resources UR.

In an embodiment, the number of user resources J is the same for each antenna carrier AC.

In an embodiment, operation and maintenance commands OM are transmitted together with the N antenna carriers AC and/or for each antenna carrier AC.

Without loss of generality, in the following description it is assumed that the same radio frequency carriers are used for each antenna carrier AC. However, the arrangements provided herein may also be extended to multi-radio frequency carriers.

In an embodiment, the central unit CU schedules the user resources UR for the user equipments UE on the various antenna carriers AC.

In an embodiment of an OFDM system, the scheduling procedure permits to use the same time to frequency portion for different user resources UR on different antenna carriers AC.

In an embodiment of a CDMA or W-CDMA system, the scheduling procedure permits to use the same scrambling code for different user resources UR on different antenna carriers AC.

In an embodiment of a GSM system, the scheduling procedure permits to use the same frequency carrier and time-slot on different antenna carriers AC.

In an embodiment, the antenna carriers AC are multiplexed and transmitted in downlink direction on an optical fiber ring from the central unit CU to the remote units RU. The remote units RU receive the signals and de-multiplex them.

Similarly, in uplink direction the antenna carriers AC are multiplexed and transmitted on the optical fiber ring from the remote units RU to the central CU, whereby the central unit CU receives the multiplexed signals and de-multiplexes them.

In an embodiment, the same antenna carriers AC are used by different remote units RU in the DAS.

In an embodiment, an antenna carrier AC carries the same user resources UR for different RU.

In an embodiment, more than a single antenna carrier AC is routed to the same remote unit RU.

For example, a single antenna carrier AC could be shared by all remote units RU or every remote unit RU could be fed by its own antenna carrier AC.

In the embodiment illustrated, each flow is transmitted or received on the optical-fiber ring by means of an optical transmitter or optical receiver, respectively.

In an embodiment, each remote unit RU receives all antenna carriers AC and the embedded user resources UR. Subsequently, each remote unit RU extracts only the user resources UR belonging to the managed users. Thus, each remote unit RU passes transparently the downlink antenna carriers AC received from the central unit CU to the next remote unit RU.

In an embodiment, the remote unit RU extracts the user resources and weights them in a beam-forming signal processing approach, thus building "equivalent" antenna carriers $AC_{ae}$, one for each antenna element AE and possibly for each radiofrequency carrier. These equivalent antenna carriers $AC_{ae}$ are sent then to the respective antenna element AE in order to perform e.g. beam-forming.

In an embodiment, the remote unit RU extracts the user resources and weights them in a distributing signal processing approach, thus building "equivalent" antenna carriers $AC_{eq}$. These equivalent antenna carriers $AC_{eq}$ are possibly sent then to the beamforming weighting stage.

In uplink, the antenna elements AE of each remote unit RU receive an aggregate signal from the connected users UE. The receiver chain of each antenna element AE extracts then the signal corresponding to each user UE forming an antenna carrier $AC_{ae}$. These antenna carriers from each antenna element AE are then weighted and combined, thus forming the user resources UR to be processed in order to gather the corresponding antenna carrier AC. In an embodiment, the antenna carriers AC are further weighted in a distributing signal processing approach to gather the corresponding antenna carriers AC to be transmitted to the CU. Moreover, each remote unit RU combines the resulting antenna carriers AC with those received from the previous remote units RU, and sends the combined antenna carriers AC towards the next remote unit RU.

The embodiment illustrated, may provide symmetry of delays between the transmission link from the central unit CU to the remote units RU and vice versa (i.e. downlink and uplink paths with comparable delays and lengths). This may be achieved by using two parallel optical fibers (one for the downlink and one for the uplink) or with a bidirectional optical fiber. The two transmission links in opposite directions have thus substantially similar propagation delays. In fact, the downlink data flow in one direction and the uplink data flow proceed the same path, but in the opposite direction.

Figure 6:
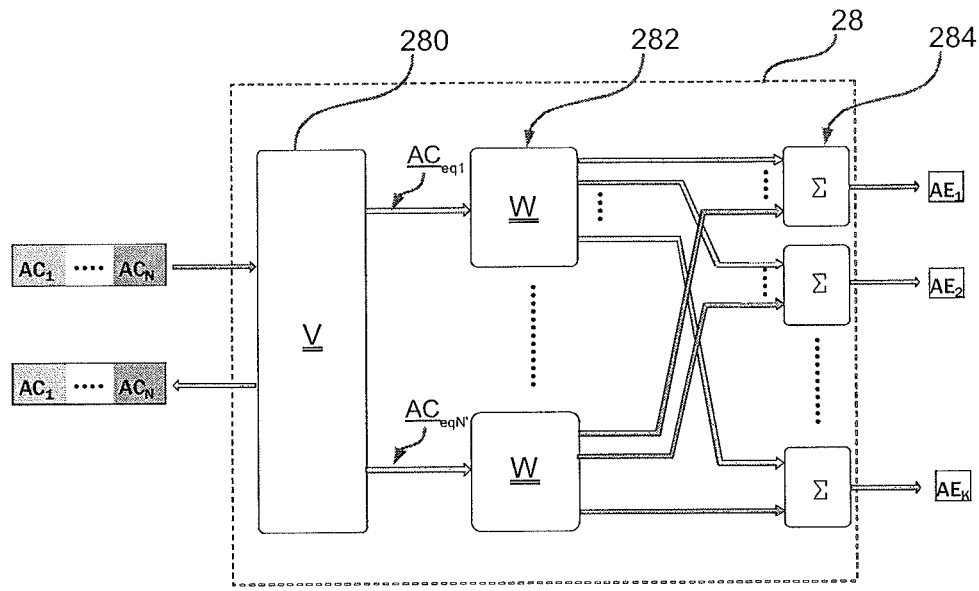
FIG. 6 is a block diagram of an weighting module for the downlink portion of a DAS system.

FIG. 6 shows an exemplary embodiment of the processing to be performed in downlink by each remote unit RU at block 28 for each radio carrier up to the maximum number of carriers supported.

In the embodiment illustrated, the vector of equivalent antenna carriers $\underline{AC}_{eq}^{m}$ for the m-th remote unit may be calculated in a block 280 according to:

$$\underline{AC}_{eq}^{m} = \underline{AC} \cdot \underline{V}^{m} \quad (1)$$

where $\underline{AC}$ is the vector of antenna carriers and $\underline{V}^{m}$ is the matrix of weights, which is defined as:

$$\underline{V}^{m} = \begin{bmatrix} \underline{V}_{1}^{m1} & \cdots & \underline{V}_{1}^{mN'} \\ \vdots & \ddots & \vdots \\ \underline{V}_{N}^{m1} & \cdots & \underline{V}_{N}^{mN'} \end{bmatrix}$$

where:

$$V_{n,ij}^{mq} = \begin{cases} v_{ni}^{mq}; & \text{for } i = j \\ 0; & \text{otherwise} \end{cases},$$

and if $v_{ni}^{mq} \neq 0$ then $v_{ki}^{mq} = 0$ for $\forall\ k \neq n$ knowing that N' is the number of equivalent Antenna Carriers on the m-th Remote Unit RU and the matrices $\underline{V}_{n}^{mq}$ have dimensions J×J where J is the number of User Resources UR on each Antenna Carrier AC.

Specifically, $\underline{AC}$ is a row vector having a length equal to the total number of user resources UR located on all antenna carriers AC:

$$\underline{AC} = [\underline{AC}_{1} \ \ldots \ \underline{AC}_{N}]$$

where $\underline{AC}_{1}, \underline{AC}_{2}, \ldots, \underline{AC}_{N}$ represent the vector notation of the above defined antenna carriers AC, wherein each element of the vector corresponds to a certain user resource UR.

$\underline{AC}_{eq}^{m}$ is a row vector having a length equal to the total number of the user resources UR managed by the m-th remote unit RU:

$$\underline{AC}_{eq}^{m} = [\underline{AC}_{eq}^{m1} \ \ldots \ \underline{AC}_{eq}^{mN'}]$$

In the equation shown in the foregoing, m stands for the m-th remote unit RU in the DAS. $\underline{AC}_{eq}^{mq}$ represents thus the vector notation of the q-th equivalent antenna carrier related to a radio-frequency carrier of the m-th remote unit RU.

In an embodiment, even in case of single radiofrequency carrier, each remote unit RU may process more than one equivalent antenna carrier. This might be useful for example in case of Space Division Multiple Access (SDMA) processing, in which users being far enough from each other could communicate with the network using the same radio resources.

The matrices $\underline{V}_{n}^{mq}$ are J×J diagonal matrices, whereby only one element for each diagonal position of all the matrices related to the same equivalent antenna carrier is different from zero and equal to a certain complex weight.

Moreover, the position on the diagonal of the relevant matrix of each complex weight is univocal, so that two complex weights may not hold the same position in different matrices. The notation of equation 1 allows building the q-th equivalent antenna carriers by weighting the corresponding user resources UR.

In the embodiment illustrated, the remote units RU may comprise a plurality of antenna elements AE in order to perform adaptive beam forming. For example, the m-th remote unit RU may contain $K_m$ antenna elements AE. The equivalent antenna carriers may thus be split in $K_m$, each of which is sent to an antenna element AE after a second weighting operation:

$$\underline{AC}_{ae}^{km} = \sum_{q=1}^{N'} \underline{AC}_{eq}^{mq} \cdot \underline{W}^{kmq} \quad (2)$$

with k=1, ... $K_m$, and $\underline{W}^{kmq}$=Diag[$w_1^{kmq}, w_2^{kmq}, \ldots, w_J^{kmq}$]
where $w_j^{kmq}$ is to be intended as the beam-forming weight (i.e. a complex number) relevant to the k-th antenna element AE on the m-th remote unit RU and to the j-th user resource UR on the q-th equivalent antenna carrier.

The multiplication element-by-element with the vector $\underline{AC}_{eq}^{mq}$ provides the vector $\underline{AC}_{ae}^{km}$ representing the equivalent antenna carrier for the k-th antenna element of the m-th remote unit RU.

In the embodiment illustrated, equation (2) is implemented by means of blocks 282 to implement the multiplication with the complex weights and blocks 284 to implement the combination of the weighted signals.

It is thus possible to control the relative amplitude and phase of the user resources UR both for each RU and for each antenna element AE of a specific remote unit RU.

It is also possible to transmit the same user resource UR having applied thereto beam-formed weights via several remote units RU with. In fact, each user resource UR is assigned only to one user equipment UE and it is thus possible to optimize both the distributing and the beam-forming weighting in order to optimize e.g. the coherence of the resulting signal received by the user UE.

Figure 7:
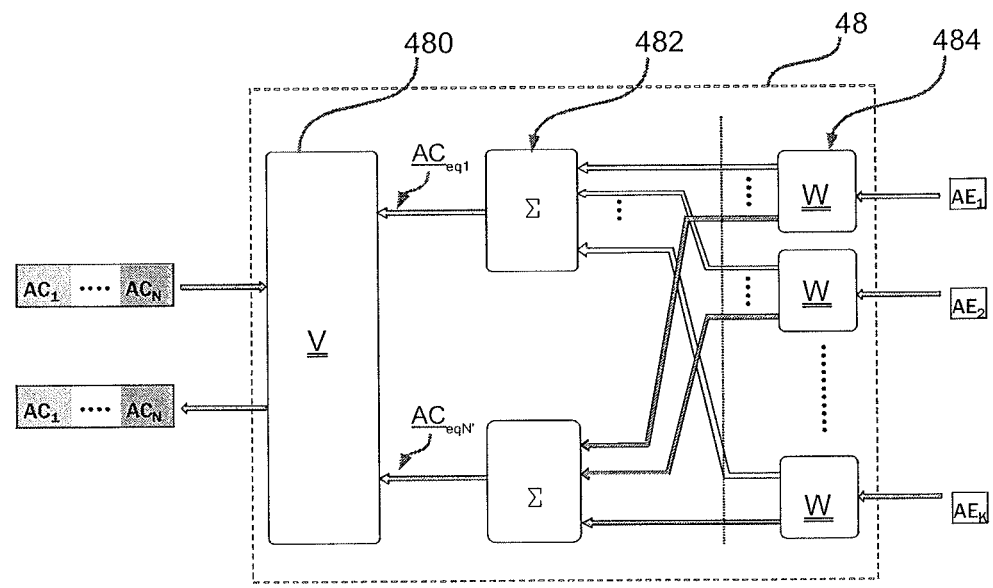
FIG. 7 is a block diagram of an weighting module for the uplink portion of a DAS system.

FIG. 7 shows an exemplary embodiment of the processing to be performed in uplink by each remote unit RU at block 48 for each radio carrier up to the maximum number of carriers supported.

As mentioned above, the antenna elements AE of each remote unit RU receive the aggregate signal from the connected users. The receiver may organize the received signal in equivalent antenna carriers:

$$\underline{AC}_{eq}^{mq} = \sum_{k=1}^{K_m} \underline{AC}_{ae}^{km} \cdot \underline{W}^{kmq} \quad (3)$$

with q=1, ... N' and $\underline{W}^{kmq}$=Diag[$w_1^{kmq}, w_2^{kmq}, \ldots, w_J^{kmq}$]
where $\underline{AC}_{ae}^{km}$ is the equivalent antenna carrier processed by the receiver chain on the k-th antenna element AE of the m-th remote unit RU, and $w_j^{kmq}$ has the same notation as in downlink processing.

The matrix multiplication provides a vector that is summed with all the beam-formed signals received by the antenna element AE, providing thus the received equivalent antenna carrier of the m-th remote unit RU.

In the embodiment illustrated, the multiplication with the beam-forming weights is performed in blocks 484 and the combination of the beam-formed signals is performed at blocks 482.

Also in uplink it is possible to process more than one equivalent antenna carrier for each remote unit RU in order to permit advanced beam-forming processing also in case SDMA is used.

All the user resource UR signals received from the m-th remote unit RU are then weighted and inserted on the relevant antenna carrier AC coming from the (m−1)-th remote unit RU in the respective position:

$$\underline{AC}^m = \underline{AC}^{m-1} + \underline{AC}_{eq}^m \cdot \underline{V}^m \quad (4)$$

where the matrix $\underline{V}^m$ is in the same form as shown with respect to equation (1).

Equation (4) permits thus to build the antenna carrier AC, wherein the signal transmitted by each user terminal could be received by a plurality of remote units RU and weighted in a distributed manner.

In the embodiment illustrated, such operation is performed at a block 480, which receives the antenna carriers AC form the previous remote unit RM and the various equivalent antenna carriers for the connected user equipments UE.

Since each user resource UR is dedicated to only one user UE it is possible to optimize the distributing and beam-forming weighting in order to optimize the coherence of the resulting signal received at the central unit CU.

The architecture described in the foregoing is per se not limited to any specific algorithms used to compute the distributing and/or the beam-forming weights both for downlink and uplink.

In an embodiment, the beam-forming weights are calculated and applied directly in the remote unit RU considering only the optimization of the signal received from or transmitted to the connected users UE, while the distributing weights could be calculated in the central unit CU and transmitted to each remote unit RU in the form of control signals together with the payload signals. In this case, the distributing weights could be calculated e.g. for optimizing the resulting signal received from or transmitted to each user UE.

In an embodiment, both beam-forming and distributing weights are calculated in the central unit CU and transmitted to each remote unit RU. In this case, the beam-forming and distributing weighing could optimize e.g. the signal received from and transmitted to each user taking into account the signal for each antenna element AE of each remote unit RU.

The above described arrangements thus permit to process the antenna carrier AC signals on a per-user basis.

In an embodiment, data is exchanged via an optical fiber in a ring configuration, wherein the data are organized as shown with respect to FIG. 5. In this case, data is organized as "per user transmission" because the antenna carriers AC exchanged via the optical fiber allow to directly extract and process (i.e. without any additional decoding) the information related to the users.

However, data may be organized also according to specifications provided by international consortia such as Common Public Radio Interface (CPRI) or Open Base Station Architecture Initiative (OBSAI). The antenna carriers AC described in those specifications contain aggregate signals corresponding to a data sector, a radio-frequency carrier or an antenna, and do not allow to extract directly the user resources UR. In that case, an at least partial inverse coding operation may be performed in the remote units RU in order to recover the user resource UR, before the described distributing and beam-forming process may be applied.

The above mentioned specifications envisage space for vendor specific management and control information which may be inserted in the transport digital frame of the physical level.

In an embodiment, these reserved bytes are used for the transmission of information related to the reconfiguration of the DAS and the remote signal processing, including e.g. the parameters for the distributing processing and possibly also the parameters for beam-forming processing. In this way it is possible to transmit such control information also in real time.

In the following exemplary scenarios are illustrated in order to better clarify the proposed architecture. The example refers to an OFDM system, but may be applied also to other radio communication systems.

In OFDM the elementary radio resources are organized in a time-to-frequency representation usually called Resources Grid (RG) that corresponds to an antenna carrier AC in the above described processing.

Example 1

In this example the following architecture is considered:
number of remote units RU: M=3;
number of antenna carriers: N=2;
number of user resources for each antenna carrier: $J_1=4$; $J_2=4$;
total number of users UE=8 (one user for each user resource UR).

FIG. 8a shows in that respect a possible user scenario, wherein:
users $UE_1$ and $UE_2$ are served only by remote unit $RU_1$;
users $UE_7$ and $UE_8$ are served only by remote unit $RU_3$;
users $UE_3$ and $UE_4$ are served in a coordinated approach by remote units $RU_1$ and $RU_2$; and
users $UE_5$ and $UE_6$ are served in a coordinated approach by remote units $RU_2$ and $RU_3$.

The association between remote units RU and users UE is made possible thanks to the application of the arrangement described in the foregoing. In particular FIGS. 8b and 8c show the case, wherein each remote unit RU builds an equivalent antenna carrier so that:
$RU_1$ builds its equivalent antenna carrier $\underline{AC}_{eq}^{11}$ using the user resources $UR_{11}$ and $UR_{12}$ for its own users (i.e. $UE_1$ and $UE_2$), and user resources $UR_{13}$ and $UR_{14}$ for the shared users with $RU_2$ (i.e. $UE_3$ and $UE_4$);
$RU_2$ builds its equivalent antenna carrier $\underline{AC}_{eq}^{21}$ using user resources $UR_{13}$ and $UR_{14}$ for the shared users with $RU_1$ (i.e. $UE_3$ and $UE_4$), and user resources $UR_{21}$ and $UR_{22}$ for the shared user with $RU_3$ (i.e. $UE_5$ and $UE_6$); and
$RU_3$ builds its equivalent antenna carrier $\underline{AC}_{eq}^{31}$ using user resources $UR_{21}$ and $UR_{22}$ for the shared user with $RU_2$ (i.e. $UE_5$ and $UE_6$), and user resources $UR_{23}$ and $UR_{24}$ for its own users (i.e. $UE_7$ and $UE_8$).

Figure 8:
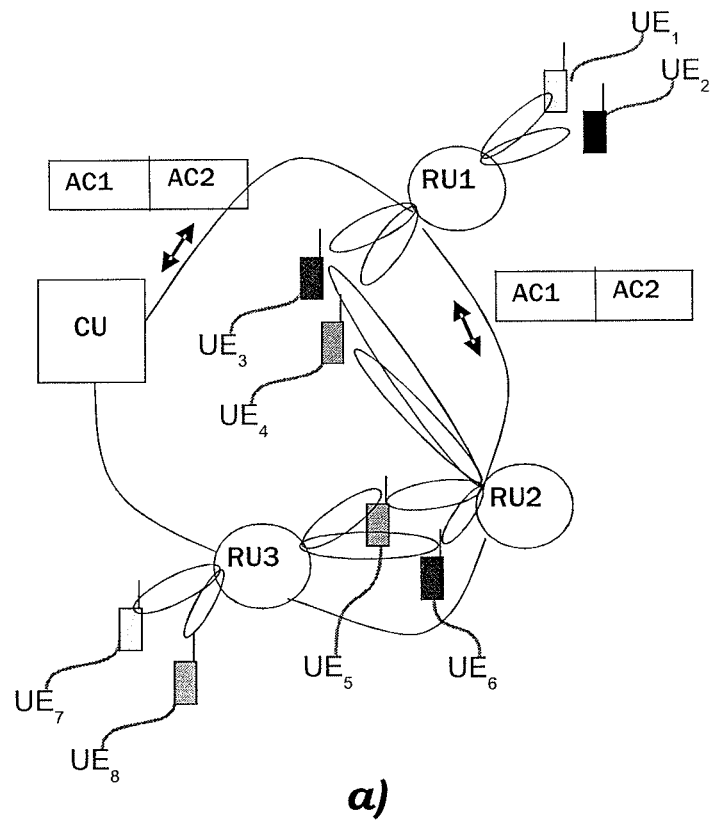
FIGS. 8a to 8c and 9a to 9c show exemplary user scenario.
Figure 8:
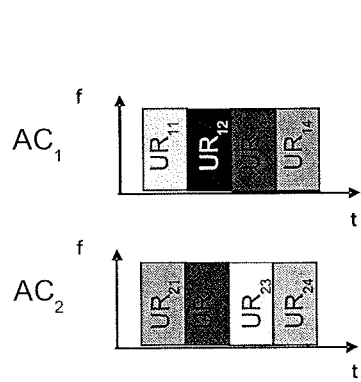
Figure 8:
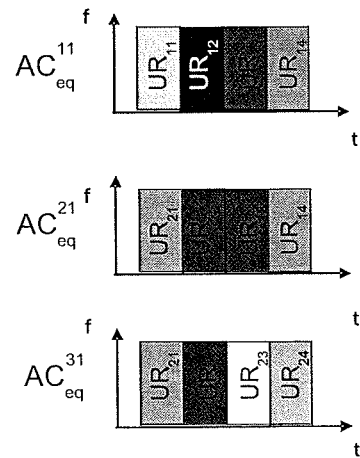

In analytic form, the schemes shown in FIG. 8 may be written as:

$$\underline{AC}_1 = [UR_{11} UR_{12} UR_{13} UR_{14}]$$

$$\underline{AC}_2 = [UR_{21} UR_{22} UR_{23} UR_{24}]$$

By applying equation (1) the equivalent antenna carries may be calculated to:

$$\underline{AC}_{eq}^{11} = [UR_{11} UR_{12} v_{13}^{11} UR_{13} v_{14}^{11} UR_{14}]$$

$$\underline{AC}_{eq}^{21} = [v_{21}^{21} UR_{21} v_{22}^{21} UR_{22} v_{13}^{21} UR_{13} v_{14}^{21} UR_{14}]$$

$$\underline{AC}_{eq}^{31} = [v_{21}^{31} UR_{21} v_{22}^{31} UR_{22} UR_{23} UR_{24}]$$

with the following weighting matrices:

$$\underline{V}_1^{11} = \begin{bmatrix} 1 & 0 & 0 & 0 \\ 0 & 1 & 0 & 0 \\ 0 & 0 & v_{13}^{11} & 0 \\ 0 & 0 & 0 & v_{14}^{11} \end{bmatrix} \quad \underline{V}_2^{11} = \begin{bmatrix} 0 & 0 & 0 & 0 \\ 0 & 0 & 0 & 0 \\ 0 & 0 & 0 & 0 \\ 0 & 0 & 0 & 0 \end{bmatrix}$$

$$\underline{V}_1^{21} = \begin{bmatrix} 0 & 0 & 0 & 0 \\ 0 & 0 & 0 & 0 \\ 0 & 0 & v_{13}^{21} & 0 \\ 0 & 0 & 0 & v_{14}^{21} \end{bmatrix} \quad \underline{V}_2^{21} = \begin{bmatrix} v_{21}^{21} & 0 & 0 & 0 \\ 0 & v_{22}^{21} & 0 & 0 \\ 0 & 0 & 0 & 0 \\ 0 & 0 & 0 & 0 \end{bmatrix}$$

$$\underline{V}_1^{31} = \begin{bmatrix} 0 & 0 & 0 & 0 \\ 0 & 0 & 0 & 0 \\ 0 & 0 & 0 & 0 \\ 0 & 0 & 0 & 0 \end{bmatrix} \quad \underline{V}_2^{31} = \begin{bmatrix} v_{21}^{31} & 0 & 0 & 0 \\ 0 & v_{22}^{31} & 0 & 0 \\ 0 & 0 & 1 & 0 \\ 0 & 0 & 0 & 1 \end{bmatrix}$$

where the weights $v_{n,ij}^{mq}$ that are not zero are fixed equal to 1 in case no distributing processing is considered: in the example $UR_{11}$, $UR_{12}$, $UR_{23}$, $UR_{24}$, while they have to be computed for the users connected to two remote units RU. For example, the weights may be determined in order to optimize the correlation between the downlink signals transmitted from the two remote units RU and received by the considered users: in the example $UR_{13}$, $UR_{14}$, $UR_{21}$, $UR_{22}$.

FIG. 8a indicates also the possibility of performing beam-forming in each remote unit RU on a per-user basis shown e.g. with respect to equation (2) for the downlink. The uplink beam-forming and distributed processing may be implemented according to equations (3) and (4) and the schemes shown in FIG. 7.

Example 2

This example is based on the user scenario of example 1, however the SDMA technique is envisaged in the remote units RU. Accordingly the following architecture may be considered:
number of remote units RU: M=3;
number of antenna carriers: N=4;
number of user resources for each antenna carrier: $J_1=2$; $J_2=2$; $J_3=2$; $J_4=2$;
total number of users UE=8 (one user for each user resource UR).

Figure 9:
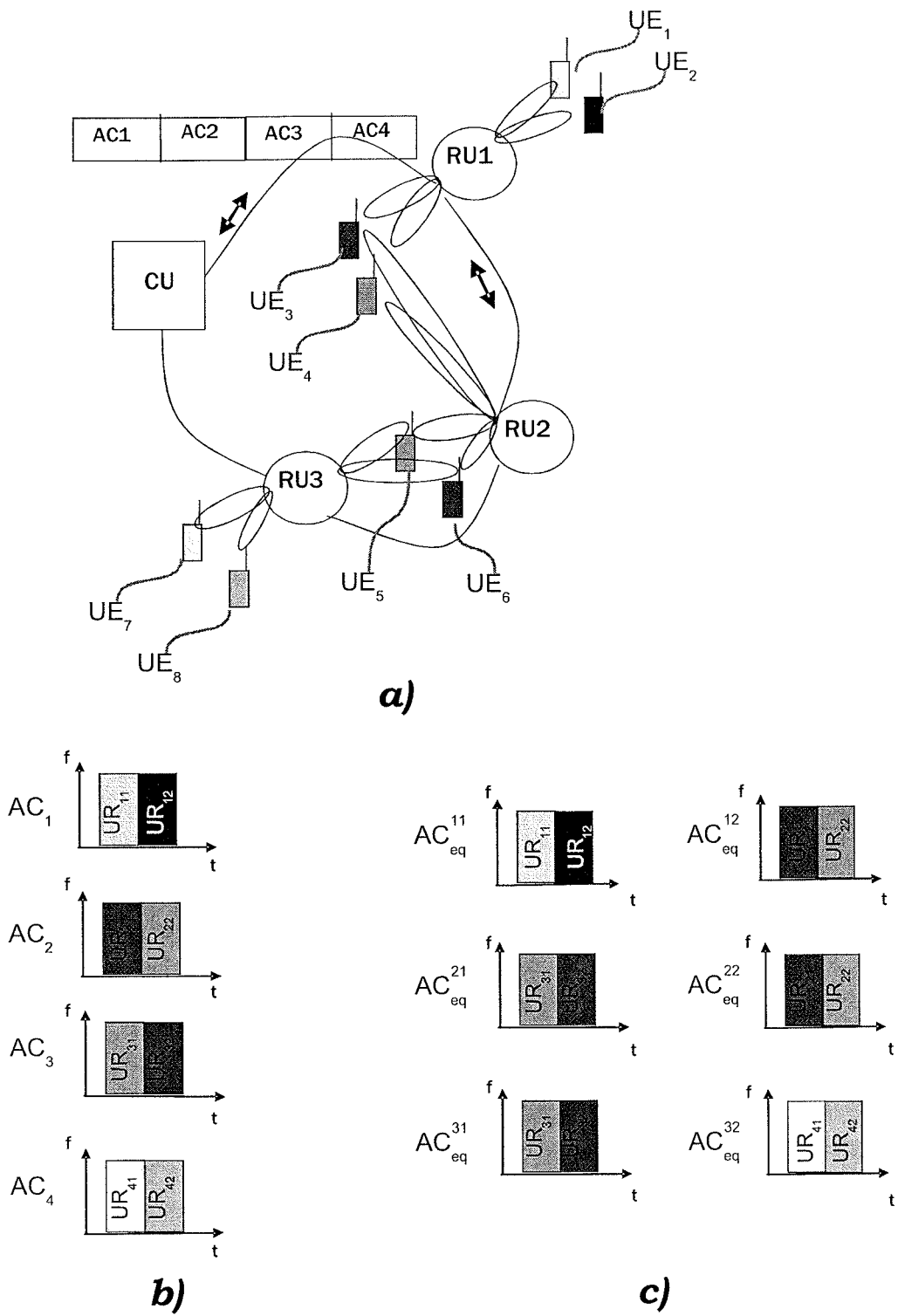

FIG. 9a shows in that respect again the user scenario and the respective data flows, wherein:
users $UE_1$ and $UE_2$ are served only by remote unit $RU_1$;
users $UE_7$ and $UE_8$ are served only by remote unit $RU_3$;
users $UE_3$ and $UE_4$ are served in a coordinated approach by remote units $RU_1$ and $RU_2$; and
users $UE_5$ and $UE_6$ are served in a coordinated approach by remote units $RU_2$ and $RU_3$.

Again, the association between remote units RU and users UE is made possible thanks to the application of the arrangement described in the foregoing. In particular FIGS. 9b and 9c show the case, wherein each remote unit RU builds an equivalent antenna carrier so that:
$RU_1$ builds a first equivalent antenna carrier $\underline{AC}_{eq}^{11}$ for its own users (i.e. $UE_1$ and $UE_2$) using the user resources $UR_{11}$ and $UR_{12}$, and a second equivalent antenna carrier $\underline{AC}_{eq}^{12}$ for the shared users with $RU_2$ (i.e. $UE_3$ and $UE_4$) using the user resources $UR_{21}$ and $UR_{22}$;
$RU_2$ builds a first equivalent antenna carrier $\underline{AC}_{eq}^{21}$ for the shared users with $RU_3$ (i.e. $UE_3$ and $UE_4$) using the user resources $UR_{21}$ and $UR_{22}$, and a second equivalent antenna carrier $\underline{AC}_{eq}{}^{22}$ for the shared users with $RU_3$ (i.e. $UE_5$ and UE5) using the user resources $UR_{31}$ and $UR_{32}$;

$RU_3$ builds a first equivalent antenna carrier $\underline{AC}_{eq}{}^{31}$ for the shared users with $RU_2$ (i.e. $UE_5$ and $UE_6$) using the user resources $UR_{31}$ and $UR_{32}$, and a second equivalent antenna carrier $\underline{AC}_{eq}{}^{32}$ for its own users (i.e. $UE_7$ and $UE_8$) using the user resources $UR_{41}$ and $UR_{42}$.

In analytic form, the schemes shown in FIG. 5 may be written as:

$$\underline{AC}_1 = \lfloor UR_{11} UR_{12} \rfloor$$

$$\underline{AC}_2 = [UR_{21} UR_{22}]$$

$$\underline{AC}_3 = [UR_{31} UR_{32}]$$

$$\underline{AC}_4 [UR_{41} UR_{42}]$$

By applying equation (1) the equivalent antenna carries may be calculated to:

$$\underline{AC}_{eq}{}^{11} = [UR_{11} UR_{12}] \underline{AC}_{eq}{}^{12} = [v_{21}{}^{12} UR_{21} v_{22}{}^{12} UR_{22}]$$

$$\underline{AC}_{eq}{}^{21} = [v_{21}{}^{21} UR_{21} v_{22}{}^{21} UR_{22}]$$
$$\underline{AC}_{eq}{}^{22} = [v_{31}{}^{22} UR_{31} v_{32}{}^{22} UR_{32}]$$

$$\underline{AC}_{eq}{}^{31} = [v_{31}{}^{31} UR_{31} v_{32}{}^{31} UR_{32}] \underline{AC}_{eq}{}^{32} = [UR_{41} UR_{42}]$$

with the following weighting matrices:

$$\underline{V}_1^{11} = \begin{bmatrix} 1 & 0 \\ 0 & 1 \end{bmatrix} \underline{V}_2^{11} = \underline{V}_3^{11} = \underline{V}_4^{11} = \begin{bmatrix} 0 & 0 \\ 0 & 0 \end{bmatrix}$$

$$\underline{V}_2^{12} = \begin{bmatrix} v_{21}^{12} & 0 \\ 0 & v_{22}^{12} \end{bmatrix} \underline{V}_1^{12} = \underline{V}_3^{12} = \underline{V}_4^{12} = \begin{bmatrix} 0 & 0 \\ 0 & 0 \end{bmatrix}$$

$$\underline{V}_2^{21} = \begin{bmatrix} v_{21}^{21} & 0 \\ 0 & v_{22}^{21} \end{bmatrix} \underline{V}_1^{21} = \underline{V}_3^{21} = \underline{V}_4^{21} = \begin{bmatrix} 0 & 0 \\ 0 & 0 \end{bmatrix}$$

$$\underline{V}_3^{22} = \begin{bmatrix} v_{31}^{22} & 0 \\ 0 & v_{32}^{22} \end{bmatrix} \underline{V}_1^{22} = \underline{V}_2^{22} = \underline{V}_4^{12} = \begin{bmatrix} 0 & 0 \\ 0 & 0 \end{bmatrix}$$

$$\underline{V}_3^{31} = \begin{bmatrix} v_{31}^{31} & 0 \\ 0 & v_{32}^{31} \end{bmatrix} \underline{V}_1^{31} = \underline{V}_2^{31} = \underline{V}_4^{31} = \begin{bmatrix} 0 & 0 \\ 0 & 0 \end{bmatrix}$$

$$\underline{V}_4^{32} = \begin{bmatrix} 1 & 0 \\ 0 & 1 \end{bmatrix} \underline{V}_1^{32} = \underline{V}_2^{32} = \underline{V}_3^{32} = \begin{bmatrix} 0 & 0 \\ 0 & 0 \end{bmatrix}$$

where the weights $v_{n,ij}{}^{mq}$ that are not zero are fixed equal to 1 in case no distributing processing is considered: in the example $UR_{11}$, $UR_{12}$, $UR_{41}$, $UR_{42}$, while they have to be computed for the users connected to two (or more) remote units RU: in the example $UR_{21}$, $UR_{22}$, $UR_{31}$, $UR_{32}$.

Adaptive beam-forming may be performed also in this case for both uplink and downlink.

In the example illustrated, the different equivalent antenna carries are transmitted using the same radio resources (e.g. time-to-frequency in case of OFDM) for different users. For example, the remote unit $RU_1$ may transmit the equivalent antenna carriers $\underline{AC}_{eq}{}^{11}$ and $\underline{AC}_{eq}{}^{12}$ over the same frequency spectrum, wherein interference may be reduced by using the mentioned adaptive beam-forming process.

Those of skill in the art will appreciate that the arrangement described herein are not limited to any specific assignment scheme between the user resources UR and the user equipments UE. More to the point, the assignment may even change for each antenna carrier AC.

Without prejudice to the underlying principles of the invention, the details and the embodiments may vary, even appreciably, with respect to what has been described by way of example only, without departing from the scope of the invention as defined by the annexed claims.

The invention claimed is:

1. A method of arranging exchange of signals between user terminals in a cellular communication system and at least one base station comprising a central unit and a plurality of remote units, comprising:
   exchanging at least one user signal with a corresponding user terminal simultaneously via at least two of said remote units;
   applying, at said at least two remote units, beam-forming weights that are calculated in the central unit; and
   in a different step, applying, at said at least two remote units, separate complex distributing weights, determined in the central unit, to said user signal exchanged with said at least one user terminal.

2. The method of claim 1, wherein said at least two remote units comprises a plurality of antenna elements, and wherein the method comprises applying complex beam-forming weights to said signals exchanged with said at least one user terminal.

3. The method of claim 1, comprising exchanging the signals between said central unit and said remote units in the form of antenna carriers, wherein said antenna carriers comprises user resources to be sent to and/or received from said user terminals.

4. The method of claim 3, wherein said signals exchanged between said user terminals and said at least one base station are orthogonal frequency division multiple access signals, and wherein said user resources are orthogonal frequency division multiple access signals in the frequency domain.

5. The method of claim 3, wherein said signals exchanged between said user terminals and said at least one base station are code division multiple access signals, and wherein said user resources are code division multiple access symbol level signals.

6. The method of claim 3, wherein said remote units are connected to said central unit via an optical fiber ring.

7. The method of claim 6, comprising performing at each remote unit in said optical fiber ring the steps of:
   receiving said antenna carriers from a previous remote unit in said optical fiber ring;
   extracting the user resources to be sent to associated user terminals; and
   forwarding said antenna carriers to a next remote unit in said optical fiber ring.

8. The method of claim 6, comprising performing at each remote unit in said optical fiber ring the steps of:
   receiving said antenna carriers from a previous remote unit in said optical fiber ring;
   combining said antenna carriers with the user resources received from associated user terminals; and
   forwarding said combined antenna carriers to a next remote unit in said optical fiber ring.

9. The method of claim 1, wherein said complex distributing weights to be applied by said remote units are capable of being configured via digital commands.

10. The method of claim 1, wherein said complex distributing weights to be applied by said remote units are capable of being configured for allocating dynamically said remote units to said user terminals.

11. The method of claim 2, wherein said beam-forming weights to be applied by said remote units are capable of being configured via digital commands.

12. The method of claim 2, wherein said complex distributing weights and said beam-forming weights to be applied by said remote units are capable of being configured for implementing a space division multiple access technique.

13. A distributed antenna system for exchanging signals with user terminals in a cellular communication system, comprising a central unit and a plurality of remote units, wherein said distributed antenna system is configured to:
- exchange at least one user signal with a corresponding user terminal simultaneously via at least two of said remote units;
- apply, at said at least two remote units, beam-forming weights that are calculated in the central unit; and
- in a different step, apply, at said at least two remote units, separate complex distributing weights, determined in the central unit, to said user signal exchanged with said at least one user terminal.

14. A non-transitory computer-readable medium storing a computer program product, loadable in a memory of at least one computer and comprising software code portions configured to perform the steps of:
- exchanging at least one user signal with a corresponding user terminal simultaneously via at least two remote units;
- applying, at said at least two remote units, beam-forming weights that are calculated in the central unit; and
- in a different step, applying, at said at least two remote units, separate complex distributing weights, determined in the central unit, to said user signal exchanged with said at least one user terminal.

\* \* \* \* \*